(12) United States Patent
Segerljung (10) Patent No.: US 7,384,233 B2
(45) Date of Patent: Jun. 10, 2008

(54) INDUSTRIAL TRUCK

(75) Inventor: Max Segerljung, Vännäs (SE)

(73) Assignee: Stock of Sweden AB, Stromsund (SE)

( * ) Notice: Subject to any disclaimer, the term of this patent is extended or adjusted under 35 U.S.C. 154(b) by 303 days.

(21) Appl. No.: 10/521,543

(22) PCT Filed: Jun. 23, 2003

(86) PCT No.: PCT/SE03/01075

§ 371 (c)(1),
(2), (4) Date: Jan. 14, 2005

(87) PCT Pub. No.: WO2004/007266

PCT Pub. Date: Jan. 22, 2004

(65) Prior Publication Data

US 2006/0155446 A1    Jul. 13, 2006

(30) Foreign Application Priority Data

Jul. 15, 2002    (SE) ................... 02022044

(51) Int. Cl.
*B66C 23/04* (2006.01)
(52) U.S. Cl. ............ 414/685; 414/718; 414/728
(58) Field of Classification Search ........... 414/685, 414/718, 728, 730
See application file for complete search history.

(56) References Cited

U.S. PATENT DOCUMENTS

| 3,598,347 | A | * | 8/1971 | Marburger | ........... 248/654 |
|---|---|---|---|---|---|
| 3,747,789 | A | * | 7/1973 | Shipley et al. | ........... 414/633 |
| 3,836,025 | A | * | 9/1974 | Olson et al. | ........... 414/547 |
| 4,159,059 | A | * | 6/1979 | Christenson et al. | ........... 414/724 |
| 4,553,899 | A | * | 11/1985 | Magni | ........... 414/629 |
| 4,666,365 | A | * | 5/1987 | Cradeur | ........... 414/745.3 |
| 4,775,288 | A | * | 10/1988 | Dimitriu | ........... 414/708 |
| 6,132,164 | A | * | 10/2000 | Way et al. | ........... 414/685 |
| 6,585,079 | B1 | * | 7/2003 | Weyer | ........... 182/2.7 |
| 6,641,355 | B1 | * | 11/2003 | McInerney et al. | ........... 414/685 |
| 6,779,961 | B2 | * | 8/2004 | Barney et al. | ........... 414/728 |
| 6,960,056 | B2 | * | 11/2005 | Hinds | ........... 414/680 |
| 2002/0069005 | A1 | | 6/2002 | Kokura | |

FOREIGN PATENT DOCUMENTS

| DE | 28 49 272 | 5/1980 |
|---|---|---|
| JP | 2002-167197 | 6/2002 |
| WO | 99/54190 | 10/1999 |
| WO | 01/36313 | 5/2001 |

* cited by examiner

*Primary Examiner*—Kevin Hurley
(74) *Attorney, Agent, or Firm*—Dilworth & Barrese LLP (57) ABSTRACT

A vehicle of the industrial truck type comprises a chassis (3), at least three wheels (4) arranged to support the chassis while resting on the ground and a lifting unit (8) connected to the chassis having one or more members (9) arranged to carry loads and a power arrangement to raise and lower the load-carrying members relative to the chassis. The lifting unit is carried by the chassis via a mast-like beam (12), that is pivotably connected to the chassis about a substantially horizontal axis. Power means is arranged to pivot the beam about this axis relative to the chassis.

16 Claims, 11 Drawing Sheets

INDUSTRIAL TRUCK

BACKGROUND OF THE INVENTION AND PRIOR ART

The present invention concerns a vehicle of the industrial truck type for handing loads according to the description herein;

The expression "vehicle of the industrial truck type" is intended to include vehicles that are suitable at least for carrying out the tasks normally carried out by a conventional industrial truck, i.e. handling loads mainly within industrial sites and warehouses as well as loading yards. A difference will be made between the handling and the transporting of loads, and vehicles that at are at least relatively often used to transport loads between locations located at a distance of a few kilometres or more apart, should not be considered to be of the industrial truck type. Different types of working machine, such as front loaders, digging machines or such, should riot be considered as being of this type either. They are not suitable for handling loads at industrial sites or warehouse sites.

It is however pointed out that the expression "vehicle of the industrial truck type" includes vehicles that can have a totally different appearance to conventional industrial trucks as long as they are suitable for the normal tasks that such a vehicle has to carry out.

The conditions under which such vehicles have to work have one thing in common; that the space in which they have at their disposal to move about in is limited since a maximal utilisation of the space at industrial sites and warehouses as well as loading yards is strived for, for cost saving reasons. It is also important that such a vehicle allows manoeuvring in an effective way, so that time and thereby costs can be saved.

A disadvantage with known vehicles of this type is that they do not provide for the desired maximum utilisation of said space and the possibility of effective manoeuvring to save time and costs to a sufficiently high degree. They are relatively clumsy in nature and sometimes have to move according to unfavourable movement patterns in order to transport themselves from one orientation and functional position at one place to a different place having another orientation and/or functional position. These unfavourable movement patterns can mean that the vehicle's sweep areas, i.e. the areas that the vehicle "shadows" during its movement, become unnecessarily large or that these sweep areas have a non-advantageous appearance, considering the "landscape" in which the vehicle will move.

Another reason for time losses is that the lifting unit's load-carrying elements of known vehicles of this type have a limited reach, so that the vehicle can be forced to take long detours or utilise the help of other tools, such as lifting wagons, to transport a load to a certain desired location, such as a long way into a truck bed, or to collect a load from such a location.

Known vehicles of this type even greatly worsen the driver's visibility in certain working situations in the direction the driver would most of all like to have good visibility, which can result in the driver having to drive the vehicle in an ineffective way, for example having to take a detour, or having to drive the vehicle as if his visibility were good with the risk of damaging the surroundings and/or the load.

SUMMARY OF THE INVENTION

The aim of the present invention is to provide a vehicle of the industrial truck type of the type defined in the introduction for handling loads, which greatly remedies at least some of the above-mentioned inconveniences with such known vehicles.

According to a first aspect of the invention, this aim is achieved by providing such a vehicle, that has the features described herein;

By arranging at least two wheels of the said first type excellent possibilities to move a vehicle of this type in narrow spaces according to advantageous movement patterns are achieved. The reason for this is that such a wheel can, so as to say, be turned on the spot without any tendency to skid by describing a circle on the ground with said rolling point on turning one revolution about the first axis. At the same time the wheels can occupy new alignments while the chassis is totally still, which means that the vehicle can be brought to reach a new position in the shortest possible or otherwise most desirable way. Since the vehicle's wheels are furthermore individually controllable and both of the wheels of the first type are individually driveable, the vehicle, hereafter called the truck, can, via the control device included in the truck, be driven according to more of less arbitrary movement patterns on movement across the ground at those sites or in those loading yards where the truck is used. This means that said sweep areas can be reduced and designed in a favourable way considering the look of the surroundings. Space and thereby costs can hereby be saved at the sites or the yards in question and yet an effective load handling is still possible. Even time can be saved during the truck's movement and load handling due to the improved controllability.

According to a preferred embodiment of the invention the vehicle comprises a regulation device to order movement of the vehicle in a horizontal plane, and the regulation device is designed with the capability, on request of a change in the direction of the vehicle in the horizontal plane, to order a position for the turning point for the vehicle located anywhere in the horizontal plane, and the control device is designed to provide instantaneous desired values for each said first wheel's angular alignment relative to the longitudinal axis of the vehicle on the basis of orders concerning said position from the regulation device and to send signals to the control means to achieve this alignment. With such a design of the regulation device and control device of the vehicle favourable movement patterns of the truck can be achieved with simple means. If the truck is to be moved without any change of its alignment in the horizontal plane, i.e. according to a translational movement, it is driven in the conventional way with the wheels parallel aligned with each other, but if an alignment change of the truck is desired, a favourable location of the vehicle's pivoting centre or turning point can be ordered by means of the regulation device and then even the alignment change can be provided via the control device by pivoting the truck about the ordered pivoting centre. This can accordingly be positioned anywhere relative to the truck, for example it can be ordered to lie at the front edge of a fork of the lifting unit, so that the truck then pivots about the fork's front edge.

According to another preferred embodiment of the invention the control device is designed to assume a parallel alignment of said wheels about the first axis on providing desired values for each wheel's alignment in the horizontal plane for a determined position of said turning point to determine each wheel's turning about said first axis relative to said parallel alignment. By assuming a determined parallel alignment of the wheels relative to each other on providing said desired values the individual wheel's turning to pivot the truck about an ordered pivot centre can be determined in an excellently simple way. This even makes it possible to simply return to parallel control when desired.

According to a second aspect of the invention the declared aim is achieved by providing a vehicle of the type defined in the introduction, in which the lifting unit is carried by the chassis via a mast-like beam, that is pivotably connected to the chassis about a first substantially horizontal axis, and the power arrangement comprises first power means arranged to pivot the beam around this axis relative to the chassis.

Due to this totally new thinking within the field of industrial trucks, to arrange the lifting arrangement to be carried by a beam with this movability relative to the chassis, the lifting unit's and thereby the truck's reach can be markedly improved as compared with known industrial trucks. It becomes possible, by pivoting the beam relative to the chassis about said first horizontal axis, to reach loads that are inaccessible for known industrial trucks, at the same time the load does not have to be carried at the distance in the horizontal plane from the vehicle's centre of gravity at which it is picked up, but a desired stability of the truck can still be achieved by pivoting the beam and thereby the lifting unit to the desired position relative to the chassis. This pivoting arrangement of the mast-like beam even results in that the driver's visibility can be improved in relation to known industrial trucks with a fixed, substantially vertical beam or boom along which the lifting unit's load-carrying element can be driven, because the beam can be pivoted to a position that results in a favourable position for the beam and/or the load handled by the lifting unit as regards the visibility.

According to another preferred embodiment of the invention the beam is connected to the chassis in the vicinity of one longitudinal side of the vehicle as seen in its normal driving direction, which means that the beam gets out of the viewing direction normally desired by the driver. The vehicle thereby advantageously comprises a device for attaching the lifting unit's load-carrying members in the vicinity of the free end of the beam which is distant to the chassis, and this device comprises a member connected to said end of the beam which is arranged to extend towards the vehicle's centre as seen in its normal driving direction to maintain an attaching point for the load-carrying members at the attaching device substantially centred relative to a horizontal longitudinal axis of the vehicle extending in said normal driving direction through the vehicles centre of gravity. A good state of equilibrium can hereby be achieved despite the lateral displacement of the beam.

According to another preferred embodiment of the invention the beam comprises several elongated beam members that are displaceable relative to each other in the longitudinal direction of the beam, and the power arrangement comprises second power means arranged to displace said beam members relative to each other to change the length of the beam. The reach of the truck can hereby be further improved, at the same time as the beam requires little space when it does not have to be long. The beam members are thereby advantageously telescopically received in each other and displaceable relative to each another.

According to another preferred embodiment of the invention the load-carrying members are arranged in the vicinity of the free end of the beam that is distant from the chassis, the load-carrying members are pivotably connected to the beam about a substantially horizontal second axis, and the power arrangement comprises a third power means arranged to cause pivoting of the load-carrying members or a part carrying these about said second horizontal axis. This second horizontal axis will subsequently necessarily be parallel with the first horizontal axis. The load-carrying members, such as forks, of the lifting unit can hereby be put into different sloping positions relative to the chassis for optimal handling of loads. The control device is thereby advantageously arranged to co-ordinate the control of the first, second and third power means to achieve the desired movement pattern in a vertical plane of the load-carrying members height-wise, length-wise and in the rotating direction. In this way it is possible to achieve more or less any desired movement pattern of the load-carrying members and thereby the load carried on them within the area that the load-carrying members can reach relative to the truck's chassis. For example the load-carrying members can be moved in favourable paths while maintaining a constant angle, advantageously 0°, relative to a horizontal plane. Such paths can for example extend in a vertical plane or a horizontal plane relative to the vehicle or in a plane with a favourable angle relative to a horizontal plane or in a path having some other shape, curved for example. This makes it possible for example to drive the load-carrying members a long way into the loading space of a railway wagon, a truck bed or such while maintaining a substantially horizontal alignment of the load-carrying members and a substantially constant distance between them and the floor or ground of that space.

According to another preferred embodiment of the invention the beam is arranged at the rear end of the vehicle in the vehicle's normal driving direction with its connection to the chassis via its first horizontal axis for pivoting relative to the chassis, at the same time as the beam is arranged in the vicinity of one longitudinal side of the vehicle as seen in its normal driving direction. This means that the possibility to lower the beam exists so that in an inactive position it is arranged to extend substantially along one side of the vehicle so as to then be in the way as rarely as possible.

According to another preferred embodiment of the invention the vehicle comprises a driver's seat that is pivotably arranged relative to the chassis about a substantially vertical axis, and the vehicle comprises power means manoeuvrably arranged to pivot the driver's seat around said vertical axis relative to the chassis for alignment of the driver's seat relative to the chassis depending on the prevailing operation of the vehicle and/or the desire of the driver. Such pivotability of the driver's seat in combination with the possibilities of driving the inventive vehicle in a favourable direction relative to its alignment in the space make it possible to constantly handle the vehicle so that optimal visibility is achieved in those cases where this should have the highest priority.

Further advantages as well as advantageous features of the invention are apparent from the following description; and

BRIEF DESCRIPTION OF THE DRAWINGS

Preferred embodiments of the invention are described below as examples with reference to the attached drawings, in which.

DETAILED DESCRIPTION OF PREFERRED EMBODIMENTS OF THE INVENTION

Figure 1:
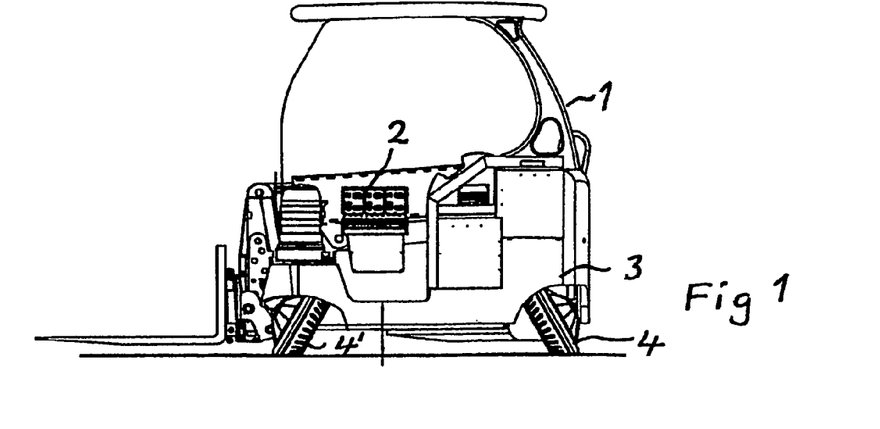
FIG. 1 is a side view of a vehicle according to a preferred embodiment of the invention.
Figure 2:
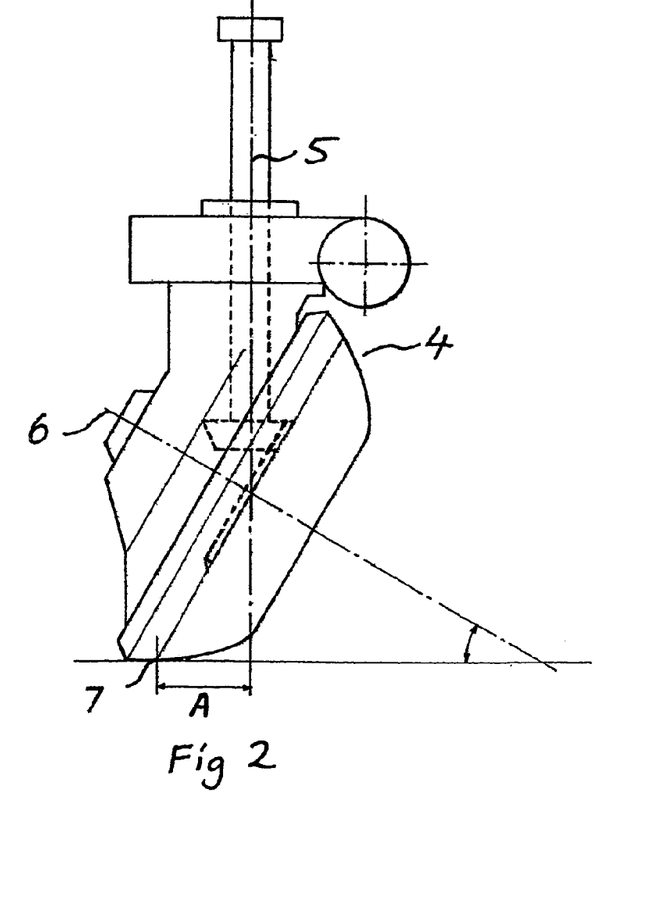
FIG. 2 is a schematic view illustrating the general structure and function of a wheel of a said first type of such a load-handling vehicle.

FIG. 1 schematically illustrates the design of an inventive vehicle 1 for handling loads of the industrial truck type, hereafter called a truck, with a driver's seat 2, that is arranged to be pivotable about a substantially vertical axis relative to a chassis 3 of the vehicle. In order to provide such a pivoting a power means, that is not shown, is provided and manoeuvrable by the driver. Wheels 4 of a first type are arranged on a chassis in the vicinity of each corner of a rectangle in the horizontal plane. Such a wheel of a said first type is shown in FIG. 2 and is rotatably arranged relative to the chassis partly around a first, substantially vertical axis 5, partly around a second axis 6, that constitutes an angle greater than 0° but less than 90°, here about 60°, relative to the first axis. The wheel has a contact surface against the ground which defines a so-called rolling point 7 against it, which is laterally displaced in the horizontal plane relative to the first axis (region A). This displacement of the rolling point 7 relative to the first axis 5 means that on turning the wheel one revolution about the axis a circle will be defined on the ground by the wheel's rolling point 7.

All four wheels are individually controllable as regards the turning about the first axis 5, while two of them, in the present case both of the front wheels 4', are individually driveable (any two of the wheels or three or four of them could be individually driveable). This design of the wheels means that they can occupy any position while the chassis is totally still.

Figure 3:
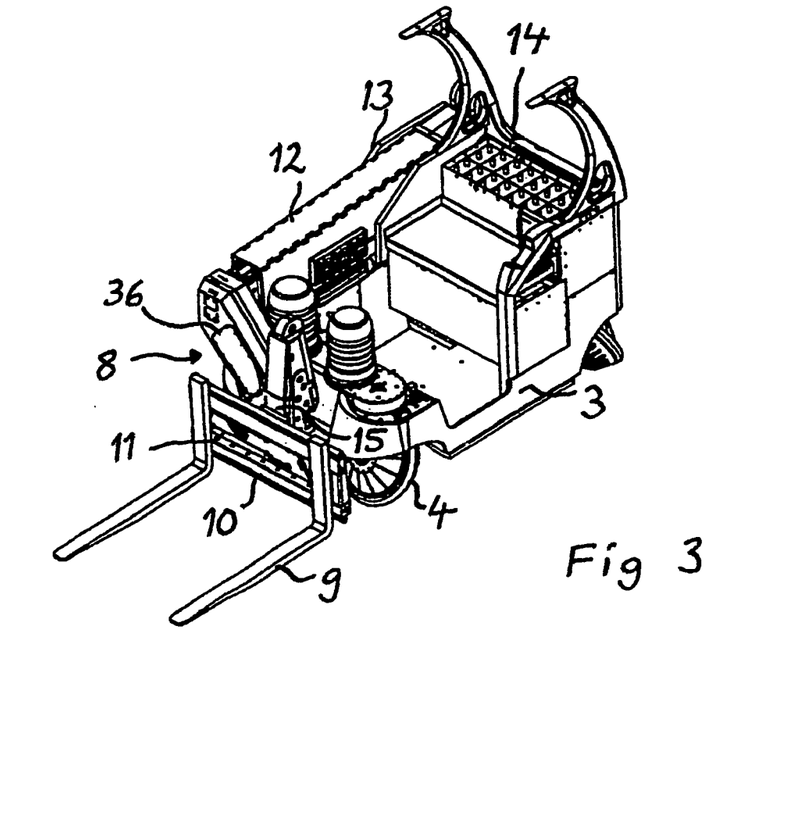
FIG. 3 is a perspective view shown diagonally from above of the vehicle according to FIG. 1 with its roof excluded.

The inventive truck further comprises a lifting unit 8 (see FIG. 3) with load-carrying members in the form of forks 9, that are displaceably arranged towards and from each other and with a constant mutual distance to a first or second side along a frame 10 via only schematically indicated power means 11. The lifting unit is carried by the chassis via a mast-like beam 12, whose structure and function, together with the lifting unit, will be described in more detail in the following. This beam is connected to the chassis at one longitudinal side 13 of the truck at the back end 14 of the truck in the normal driving direction of the truck. The beam is thereby pivotably connected to the chassis about a first substantially horizontal axis, so that it can be pivoted to the position shown in FIG. 3 extending substantially horizontally along one of the sides of the vehicle in its lowered position. It is apparent from FIG. 3 that the load-carrying members can be held so that the tendency of the truck to tip sideways is avoided despite this arrangement of the beam. More particularly the truck has a device 15 for attaching the lifting unit's load-carrying members in the vicinity of the beam's free end that is distant from the chassis, and this device comprises an arm-like member 36 that is arranged to extend towards the vehicle's centre as seen in its normal driving direction to maintain an attaching point for the load-carrying members at the attaching device substantially centred relative to a horizontal longitudinal axis of the vehicle extending in said normal driving direction through the vehicle's centre of gravity.

Figure 4:
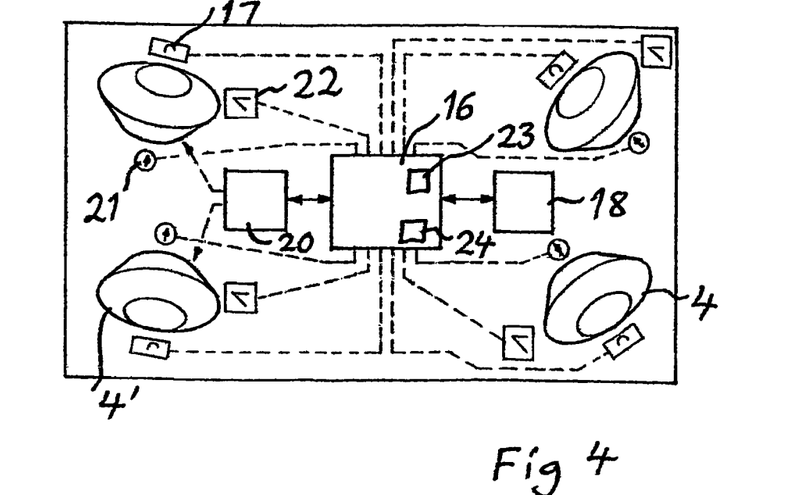
FIG. 4 illustrates very schematically the components that are used on controlling a movement of a vehicle according to the invention.
Figure 6:
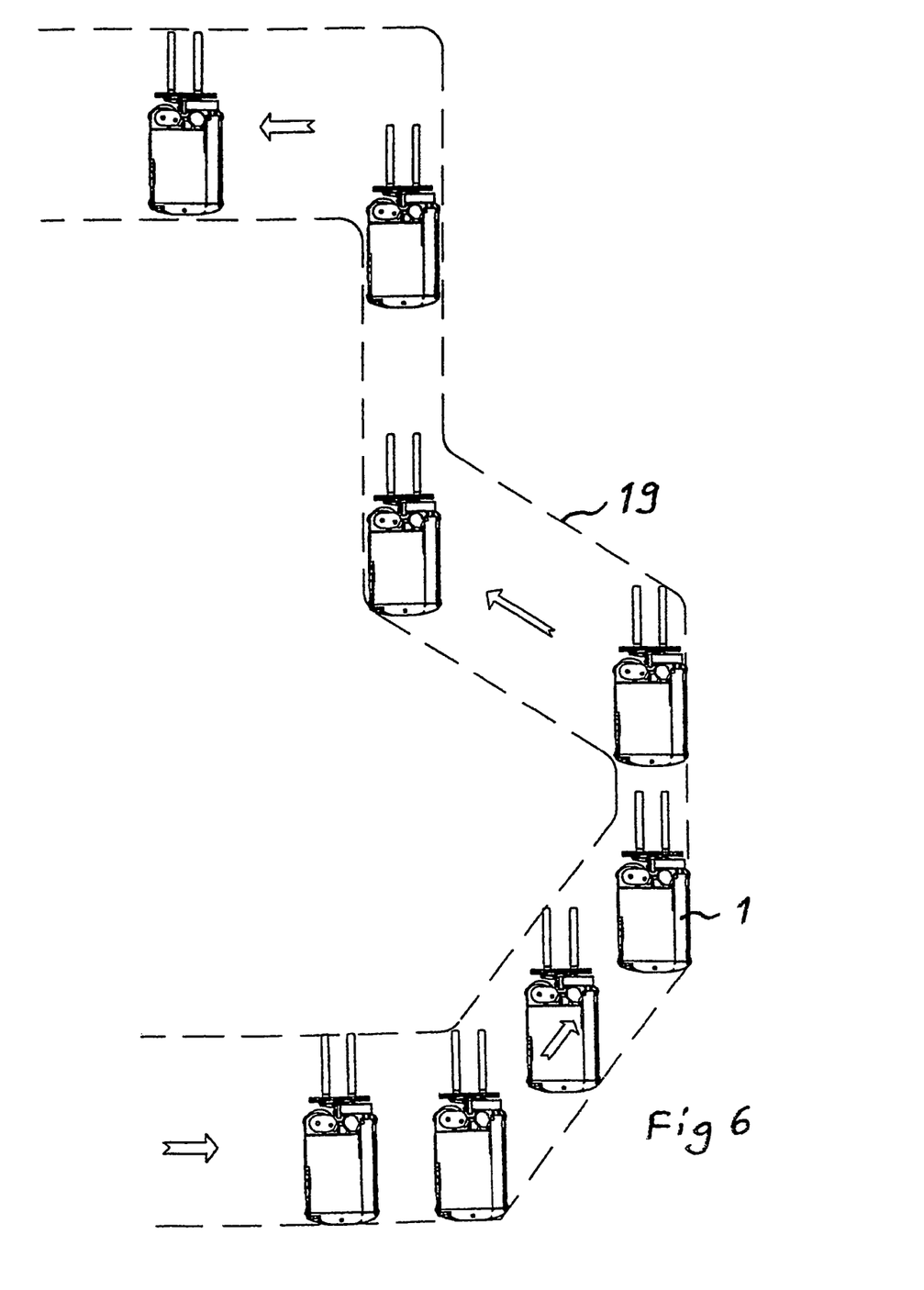

With the help of FIG. 4 how the control of movements of the inventive truck over the ground takes place will now be described. For this reason the truck has a control device 16 that is arranged to control said wheels via means 17 for individual control of the wheels according to the basic principle that they should be mutually parallel aligned during movements of the vehicle in the horizontal plane with the exception of on an ordered change of the vehicle's alignment in the horizontal plane ordered by the regulation device 18. With this it is meant that in order to come to a position that does not lie along the vehicle's longitudinal axis and in which the vehicle will have the same alignment as that prevailing the vehicle's alignment is not changed to drive towards the position and then changed back, as is necessary with conventional trucks, but translational movements of the vehicle between different points take place in such cases without requiring temporary alignment changes of the vehicle, and examples of such movements are shown in FIG. 6, where the vehicle's driving direction is changed by changing the alignment of the mutually parallel aligned wheels relative to the vehicle's longitudinal direction. The dashed line indicates the so-called sweep area 19 that the vehicle "shadows" when it drives forwards over the ground. This sweep area define's a space that has to be free in order for the truck to be able to move over the ground, and due to the design of the inventive vehicle and way of controlling it a great flexibility is achieved as regards the variation of this sweep area and possibilities to reduce it where the available space is limited. The truck further has drive means 20 to individually drive both of the drivable wheels. Furthermore the vehicle has means 21 to detect the drive wheels' rotational velocity and direction and means 22 to detect the respective wheels' actual angle relative to the vehicle's longitudinal axis to send values of the detected parameters to the control device 16 in order to, via means 23 contained therein, compare the results of the detections with the corresponding desired values ordered via a calculation unit 24, and the control device is arranged to correct the control signals to the control means 17 and drive means 20 on deviation of said results from the desired values to achieve an agreement between the results and the desired values. The control device is advantageously a programmable computer, that can be re-programmed when necessary.

Figure 5:
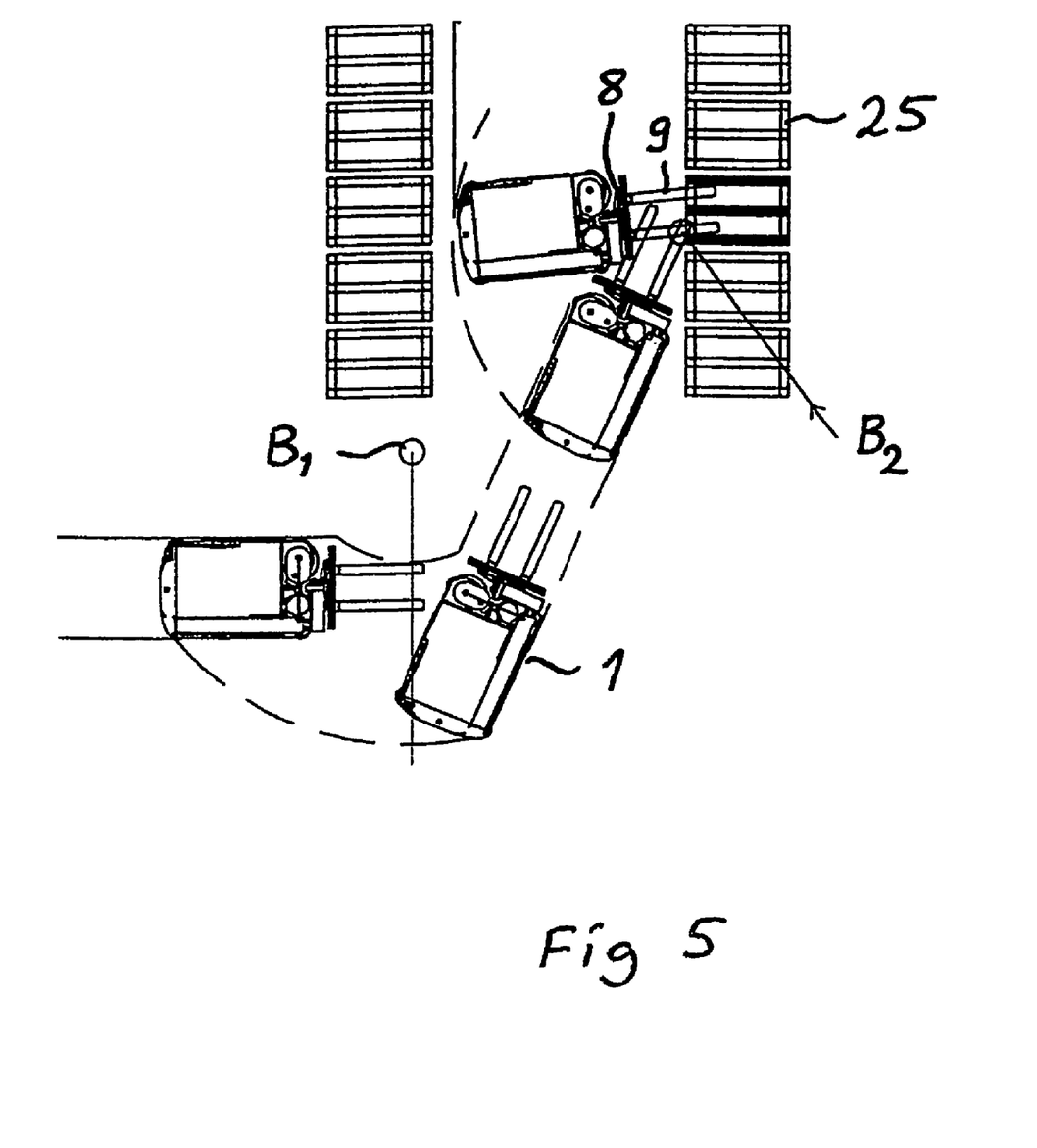
FIGS. 5-7 are schematic views from above illustrating possible ways of driving a vehicle according to the invention.
Figure 7:
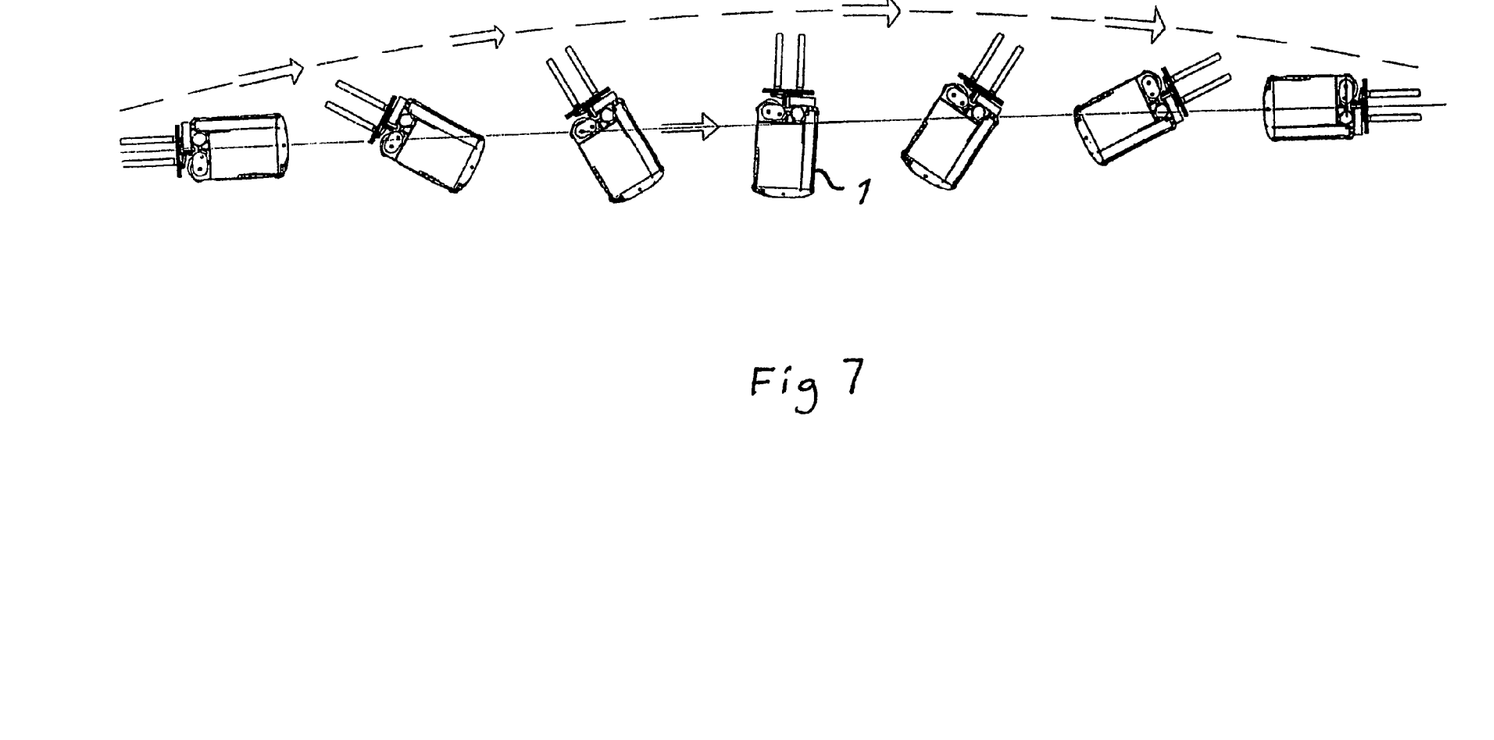

FIGS. 5-7 show two of the infinite number of movement patterns achievable by a truck according to the present invention, which can not be obtained with a conventional truck. In FIG. 5 the truck's driver orders, via the regulation device, firstly a pivoting of the truck about a pivoting centre $B_1$ that lies in front of and to the side of the truck. After then driving straight ahead to a row 25 of loading pallets or such, the driver decides that it is suitable to pivot the truck about a pivoting centre $B_2$ located at the front edge of one of the forks 9 of the truck's lifting unit. The driver does not thereby need to reverse and drive the vehicle forwards a number of times in order to get into the right position to lift the pallet in question, but this can be achieved directly. FIG. 7 illustrates how the truck's control device can control the truck to move along a straight line at the same time as it pivots 180° in order to be directed in the direction opposite to the initial direction.

In the following FIGS. 8-15 the inventive truck's properties and advantages as regards its load-handling capability are illustrated in more detail. It is apparent from these figures that the beam 12 for carrying the lifting unit is firstly, as already described, pivotably connected to the chassis about a first substantially horizontal axis 26. A power arrangement to raise and lower the load-carrying members relative to the chassis comprises only schematically indicated first power means 27 in the form of a hydraulic cylinder arranged to act between the beam and the chassis to provide this pivoting.

Secondly the beam is built up of several, three in this case, elongated beam members 28 that are telescopically received in each other and displaceable relative to one another in the longitudinal direction of the beam. In order to provide such a displacement the power arrangement comprises a second, schematically indicated power means 29 in the form of a hydraulic cylinder. Thirdly the load-carrying members are pivotably connected to the beam at its free end distant to the chassis about a substantially horizontal second axis 30, and the power arrangement comprises a schematically indicated third power means 31 in the form of a hydraulic cylinder arranged to provide pivoting of the load-carrying members or the frame 10 or such on which they are arranged about the axis 30. The second axis 30 is therefore parallel to the first axis 26, and in this embodiment both are substantially perpendicular to the truck's normal driving direction.

Figure 8:
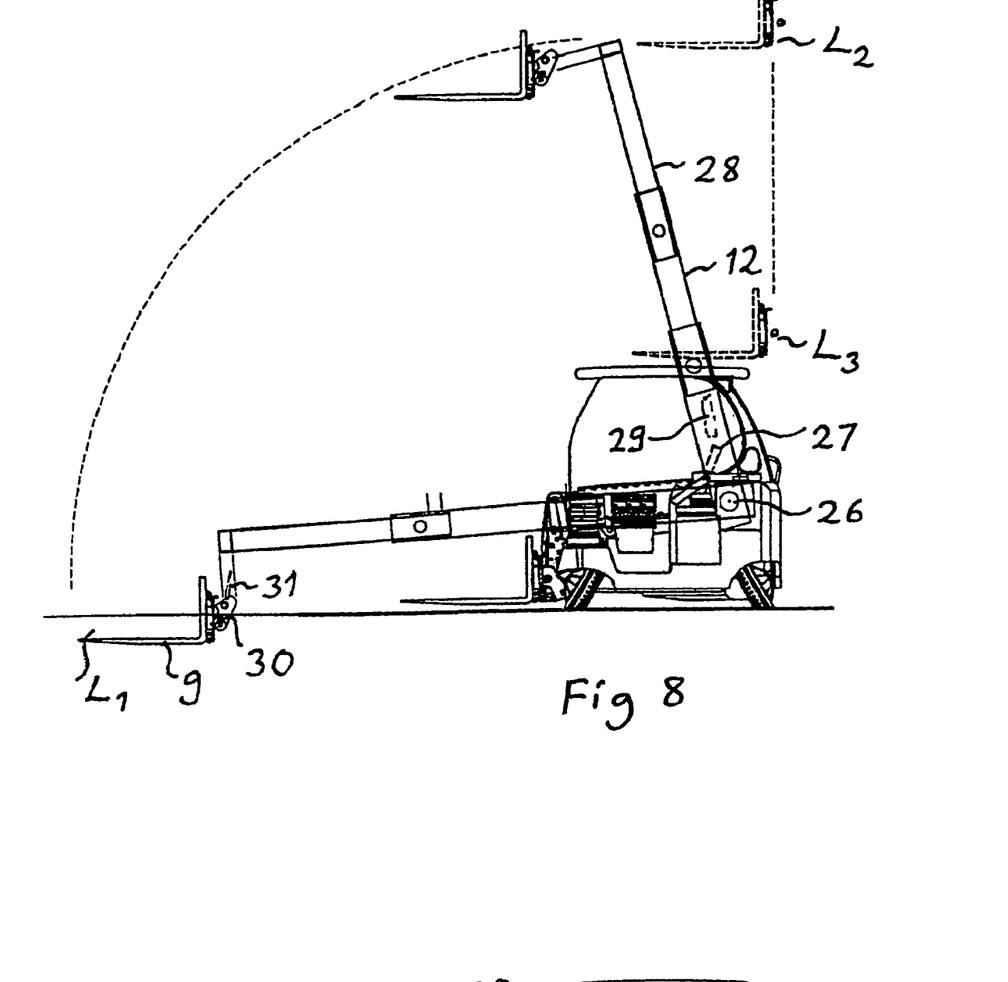
FIGS. 8-13 are side views of the vehicle according to FIG. 1 illustrating a part of a number of movement patterns of the lifting unit achievable on a vehicle according to the invention.
Figure 9:
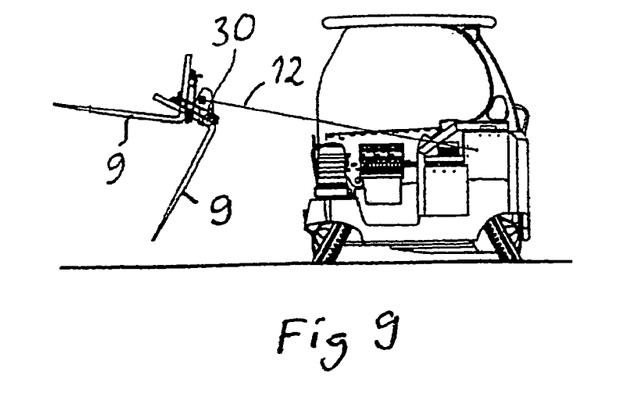

The control device 16 is arranged to coordinate the control of the first, second and third power means to achieve a desired movement pattern ordered by the driver in a vertical plane of the load-carrying members height-wise, length-wise and in the rotating direction. The control device can thereby for example be arranged to provide said coordination so that the load-carrying members maintain a constant angle, for example 0°, relative to a horizontal plane during said displacement movement and/or the pivoting movement of the beam. This case is schematically illustrated in FIG. 8, where it is shown how the forks 9 are held substantially horizontally directed all the time during their movement from a lower position $L_1$ long in front of the truck, upwards while pivoting the beam about axis 26 and the forks' attachment point about the axis 30, to an upper position $L_2$ directly above the truck and then to a lower position $L_3$ above the truck's roof during displacement of the beam elements into each another. FIG. 9 shows how the forks 9 can be pivoted about the axis 30 at an otherwise constant position of the beam 12.

Figure 10:
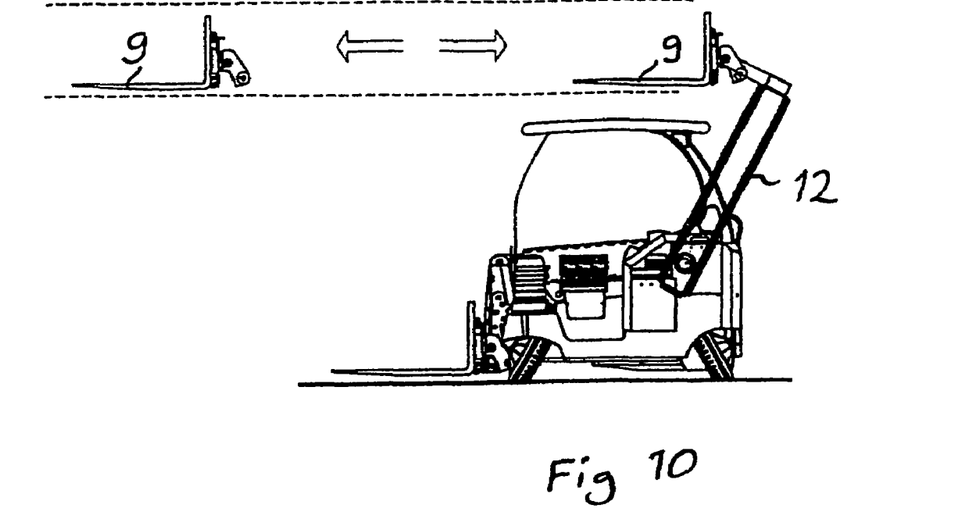
Figure 11:
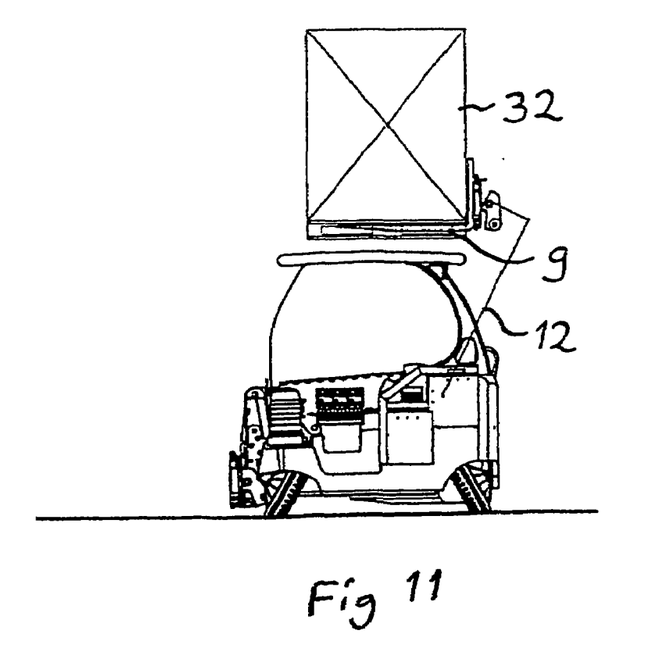

FIG. 10 schematically illustrates a different movement pattern that is possible to achieve by the control device's coordination of said three power means' function, and here the lifting unit's load-carrying members are moved in a horizontal plane above the truck with these substantially horizontally directed all of the time. A load can thereby for example be collected from a shelf or such at a certain height and then be driven into a position directly above the truck's roof, as shown in FIG. 11, and the load 32 is carried in this way in order to provide good visibility for the driver and save room as regards the total extension in the horizontal plane of the loaded vehicle.

Figure 12:
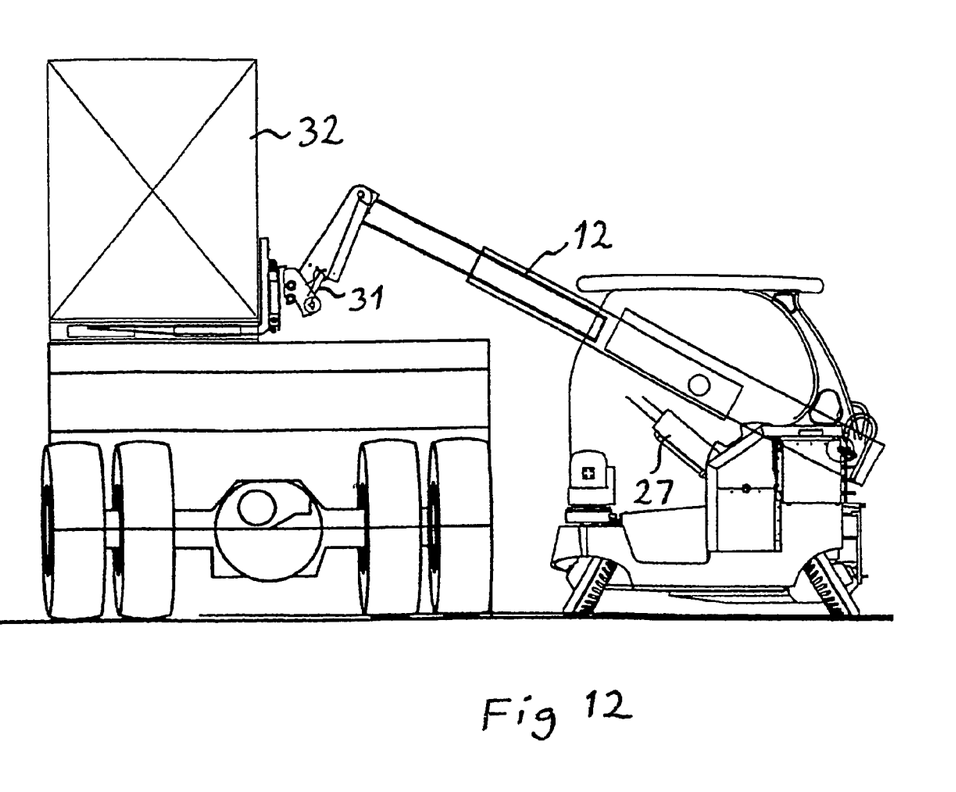

FIG. 12 clearly illustrates the excellent reach obtained by the inventive design of the truck's lifting unit with beam in that a load 32 can simply be delivered on the opposite side of the truck onto a truck bed or a trailer or be collected from there on unloading. The forks can thereby be driven directed substantially parallel to the horizontal plane on displacement along the truck bed's floor in under the loading pallet that the load is resting on.

Figure 13A:
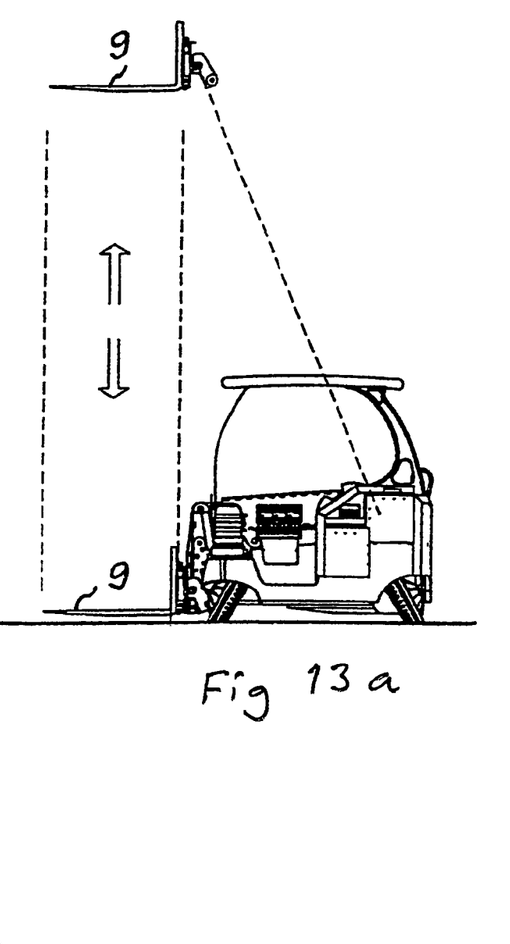
Figure 13B:
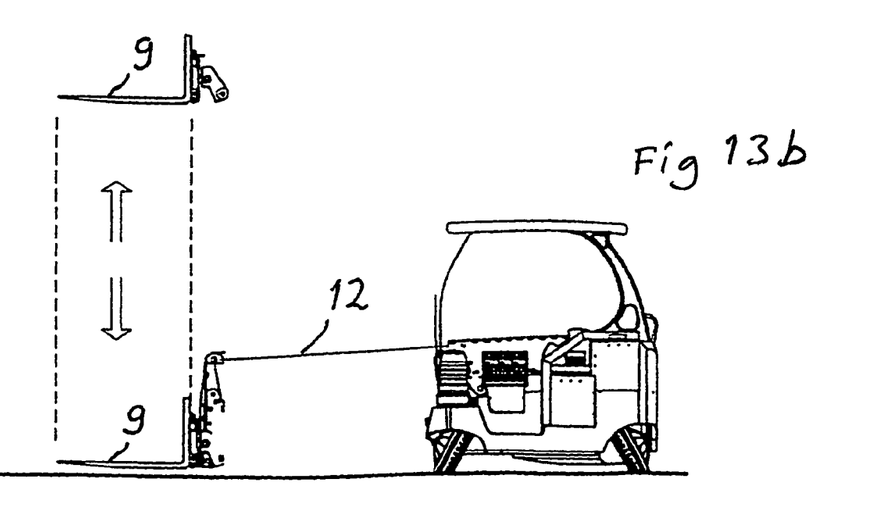

FIG. 13 schematically illustrates another movement pattern achievable with the inventive truck's lifting unit, and here the load-carrying members 9 (the forks) are moved up and down in a vertical plane while maintaining the alignment thereof substantially parallel to the ground. It is shown how this can be done at different distances from the truck. Even this movement pattern can contribute to utilising the available space better in certain working situations.

Figure 14A:
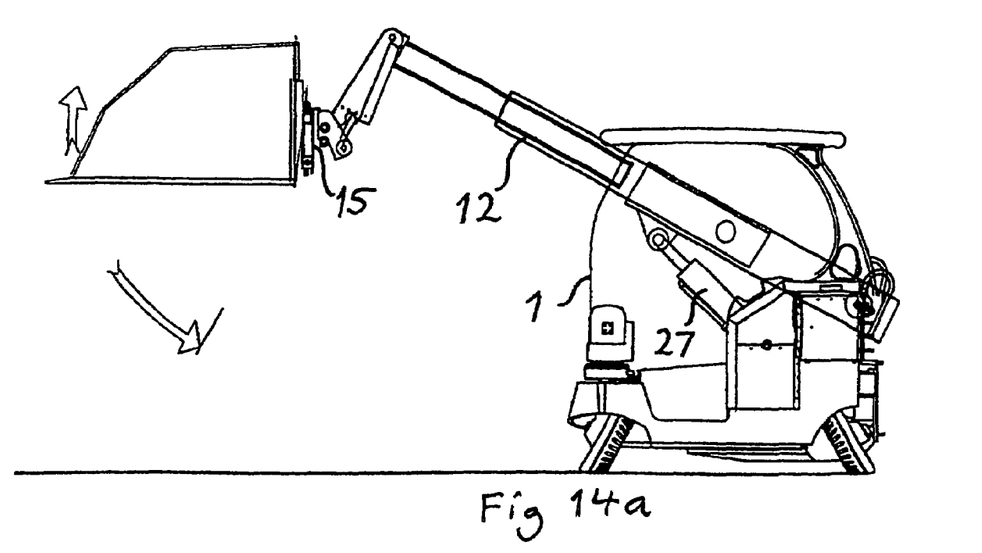
FIG. 14 is a view illustrating that different tools can be attached to a vehicle according to the invention.
Figure 14B:
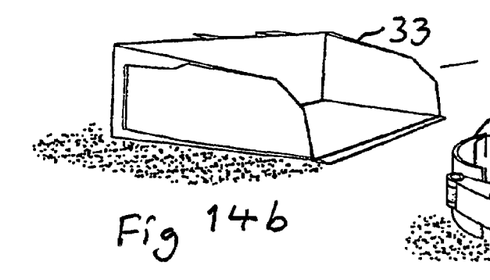
Figure 14C:
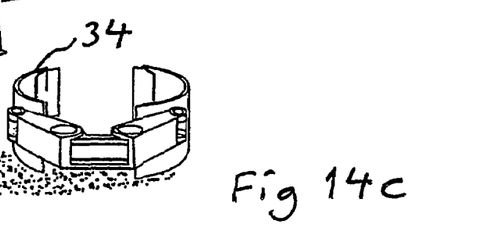

FIG. 14 schematically illustrates how the lifting unit's load-carrying members are replaceably attachable to the beam's end via said attachment device 15 to attach tools or instruments at this end. The truck's field of use is hereby increased and some examples of such instruments in the form of a scoop 33 and a clamping unit 34 are shown here. The attachment device is thereby advantageously of the quick-fitting type, so that the driver does not have to get out of the truck to change the instruments. The same applies in cases where the instruments have drive units, i.e. these are then driveable in power-transmitting connection with the truck's power system, usually a hydraulic system, via manoeuvring from outside the driver's seat without the driver having to leave the truck.

Figure 15A:
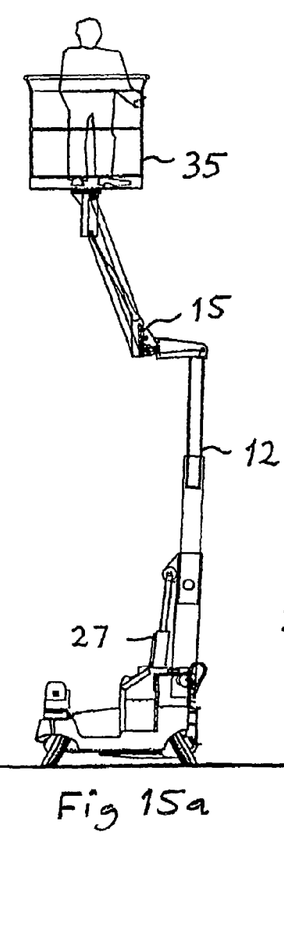
FIG. 15 illustrates one of a number of possible uses of vehicle according to the invention, which are not possible with a conventional vehicle of the industrial truck type.
Figures 15B, 15C:
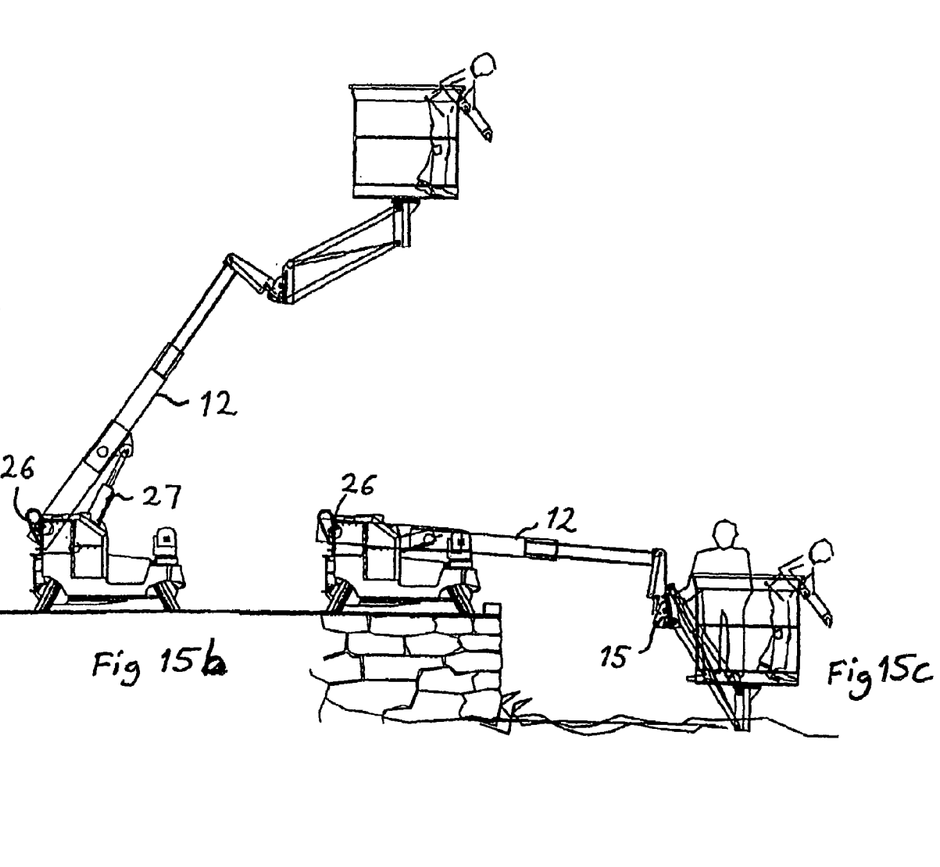

FIG. 15 illustrates how an instrument in the form of a so-called man basket 35 can advantageously be connected to the inventive truck's attachment device 15 to make use of the advantageous movement patterns that the inventive lifting unit with the beam make possible. The man basket 35 can therefore be moved vertically and horizontally while safely maintaining the horizontal alignment of its floor. The vehicle is thereby advantageously equipped with means to make remote manoeuvring of the manoeuvring arrangement 18 and thereby the control device 16 possible.

The inventive truck is even provided with a system, not shown in the drawings, to monitor the truck's stability and to warn when a tipping point of the truck is approaching an outer edge of the truck's stability area. The stabilising arrangement has means for this reason which on reaching a boundary of the stability area near to the outer edge influence different driving means and power means of the truck to carry out movements with a stabilising effect to move the truck's tipping point away from said boundary of the stabilising area.

Due to the above-described arrangement of the driver's seat 2 the driver's seat can be aligned relative to the chassis depending on the prevailing operation mode of the vehicle and desire of the driver, so that it can constantly have the alignment relative to the vehicle which the driver desires. For example the driver can make sure that it is directed in the driving direction independently, of how this is related to the vehicle's normal driving direction (longitudinal direction) if so desired.

It is apparent from the above that the inventive load-handling vehicle of the industrial truck type has unique properties as regards the flexibility of the movements for the truck's movement and for the lifting unit's movements relative to the truck, which both improve the vehicle's way of working in given working situations relative to known vehicles of this type and extend the vehicle's field of use to work that could not previously be carried out by one and the same such vehicle.

This invention is not of course in any way restricted to the preferred embodiments described above, but a number of modification possibilities should be apparent to a person skilled in the art, with having to depart from the basic idea of the invention.

"Load" and "load-handling" are intended to have a broad meaning here and include all types of loads that can be lifted by the vehicle's lifting unit.

In the above-described example the vehicle has four wheels, but it could even have three wheels or possibly more than four. It is thereby only necessary that two of the wheels are of said first type, even if it is advantageous if all of them are of this type, such as in the illustrated case.

As regards the use of the words "horizontal" and "vertical" in this document in relation to the vehicle and its structure and control these concern a position where the vehicle is resting on horizontal ground, and axes and such are naturally differently directed on driving on sloping ground or over obstructions.

The invention claimed is:

1. Vehicle, of the industrial truck type, for handling loads, comprising
   a chassis (3),
   at least three wheels (4 4') arranged to support the chassis (3) while resting on the ground,
   a lifting unit (8) connected to the chassis (3) and having one or more members (9) arranged to carry loads and a power arrangement to raise and lower the load-carrying members (9) relative to the chassis (3),
   a beam (12) carrying the lifting unit (8) and pivotably connected to the chassis (3) about a first substantially horizontal axis (26) extending between at least two of the three wheels (4, 4'), and
   the power arrangement comprising first power means (27) arranged to pivot the beam (12) around this axis (26) relative to the chassis (3), wherein
   the beam (12) comprises several elongated beam members (28) that are displaceable relative to each other in the longitudinal direction of the beam (12), and the power arrangement comprises second power means (29) arranged to displace said beam members (28) relative to each other to change the length of the beam (12),
   the load-carrying members (9) are arranged in the vicinity of a free end of the beam (12) that is distant from the chassis (3), the load-carrying members (9) are pivotably connected to the beam (12) about a substantially horizontal second axis (30), and the power arrangement comprises third power means (31) arranged to cause pivoting of the load-carrying members or a part carrying these about said second horizontal axis (30),
   a control device (16) is arranged to coordinate the control of said first, second and third power means (27, 29, 31) to achieve the desired movement pattern in a vertical plane of the load-carrying members (9) height-wise, length-wise and in the rotating direction, and
   the control device (16) is arranged to carry out said co-ordination so that the load-carrying members (9) maintain a constant angle relative to a horizontal plane during said displacement movement and/or pivoting movements of the beam (12).

2. Vehicle according to claim 1, wherein the beam (12) is connected to the chassis (3) in the vicinity of one longitudinal side (13) of the vehicle as seen in its normal driving direction.

3. Vehicle according to claim 1, wherein said constant angle is 0°.

4. Vehicle, of the industrial truck type, for handling loads, comprising
   a chassis (3),
   at least three wheels (4 4') arranged to support the chassis (3) while resting on the ground,
   a lifting unit (8) connected to the chassis (3) and having one or more members (9) arranged to carry loads and a power arrangement to raise and lower the load-carrying members (9) relative to the chassis (3),
   a beam (12) carrying the lifting unit (8) and pivotably connected to the chassis (3) about a first substantially horizontal axis (26) extending between at least two of the three wheels (4, 4'), and
   the power arrangement comprising first power means (27) arranged to pivot the beam (12) around this axis (26) relative to the chassis (3), wherein
   the beam (12) is connected to the chassis (3) in the vicinity of one longitudinal side (13) of the vehicle as seen in its normal driving direction, and
   the beam (12) is arranged at a rear end (14) of the vehicle in the vehicle's normal driving direction with its connection to the chassis (3) via its first horizontal axis (26) for pivoting relative to the chassis (3).

5. Vehicle according to claim 4, wherein the beam (12) comprises several elongated beam members (28) that are displaceable relative to each other in the longitudinal direction of the beam (12), and the power arrangement comprises second power means (29) arranged to displace said beam members (28) relative to each other to change the length of the beam (12).

6. Vehicle according to claim 5, wherein the beam members (28) are telescopically received in each other and displaceable relative to each another.

7. Vehicle according to claim 5, wherein the load-carrying members (9) are arranged in the vicinity of a free end of the beam (12) that is distant from the chassis (3), the load-carrying members (9) are pivotably connected to the beam (12) about a substantially horizontal second axis (30), and the power arrangement comprises third power means (31) arranged to cause pivoting of the load-carrying members or a part carrying these about said second horizontal axis (30).

8. Vehicle according to claim 7, wherein a control device (16) is arranged to coordinate the control of said first, second and third power means (27, 29, 31) to achieve the desired movement pattern in a vertical plane of the load-carrying members (9) height-wise, length-wise and in the rotating direction.

9. Vehicle according to claim 4, wherein the lifting unit's load-carrying members (9) are replaceably attachable on a beam, or such, with a device (15) for attaching tools or instruments at its end.

10. Vehicle according to claim 4, wherein
    the load-carrying members (9) are arranged in a vicinity of a free end of the beam (12) distant from the chassis (3) and pivotably connected to the beam (12) about a substantially horizontal second axis (30), and
    the power arrangement comprises separate power means (31) arranged to cause pivoting of the load-carrying members (9) or a part carrying the load-carrying members (9) about said second horizontal axis (30).

11. Vehicle according to claim 10, wherein said separate power means (31) comprise an hydraulic cylinder mounted upon the load-carrying members (9) and second horizontal axis (30).

12. Vehicle according to claim 10, wherein a control device (16) is arranged to coordinate the control of both said power means (27, 31) to achieve the desired movement pattern in a vertical plane of the load-carrying members (9) height-wise, length-wise and in the rotating direction.

13. Vehicle according to claim 12, wherein the control device (16) is arranged to carry out said co-ordination so that the load-carrying members (9) maintain a constant angle relative to a horizontal plane during said displacement movement and/or pivoting movements of the beam (12).

14. Vehicle, of the industrial truck type, for handling loads, comprising
    a chassis (3),
    at least three wheels (4 4') arranged to support the chassis (3) while resting on the ground, a lifting unit (8) connected to the chassis (3) and having one or more members (9) arranged to carry loads and a power arrangement to raise and lower the load-carrying members (9) relative to the chassis (3), a beam (12) carrying the lifting unit (8) and pivotably connected to the chassis (3) about a first substantially horizontal axis (26) extending between at least two of the three wheels (4, 4'), and the power arrangement comprising first power means (27) arranged to pivot the beam (12) around this axis (26) relative to the chassis (3), wherein the beam (12) is connected to the chassis (3) in the vicinity of one longitudinal side (13) of the vehicle as seen in its normal driving direction, and additionally comprising a device (15) for attaching the lifting unit's (8) load-carrying members (9) in the vicinity of a free end of the beam (12) which is distant to the chassis (3) and comprising a member (36) connected to said end of the beam (12) which is arranged to extend towards the vehicle's centre as seen in its normal driving direction to maintain an attaching point for the load-carrying members (9) at the attaching device (15) substantially centered relative to a horizontal longitudinal axis of the vehicle extending in said normal driving direction through the vehicle's centre of gravity.

15. Vehicle, of the industrial truck type, for handling loads, comprising a chassis (3), at least three wheels (4 4') arranged to support the chassis (3) while resting on the ground, a lifting unit (8) connected to the chassis (3) and having one or more members (9) arranged to carry loads and a power arrangement to raise and lower the load-carrying members (9) relative to the chassis (3), a beam (12) carrying the lifting unit (8) and pivotably connected to the chassis (3) about a first substantially horizontal axis (26) extending between at least two of the three wheels (4, 4'), and the power arrangement comprising first power means (27) arranged to pivot the beam (12) around this axis (26) relative to the chassis (3), wherein the lifting unit (8) has at least two load-carrying members in the form of forks (9).

16. Vehicle, of the industrial truck type, for handling loads, comprising a chassis (3), at least three wheels (4 4') arranged to support the chassis (3) while resting on the ground, a lifting unit (8) connected to the chassis (3) and having one or more members (9) arranged to carry loads and a power arrangement to raise and lower the load-carrying members (9) relative to the chassis (3), a beam (12) carrying the lifting unit (8) and pivotably connected to the chassis (3) about a first substantially horizontal axis (26) extending between at least two of the three wheels (4, 4'), and the power arrangement comprising first power means (27) arranged to pivot the beam (12) around this axis (26) relative to the chassis (3), wherein the vehicle comprises a driver's seat (2), the driver's seat is rotatably arranged relative to the chassis (3) about a substantially vertical axis relative to the chassis for alignment of the driver's seat relative to the chassis depending on the prevailing operation of the vehicle and/or the desire of the driver.

\* \* \* \* \*